US010052651B2

(12) United States Patent
Ramosevac

(10) Patent No.: US 10,052,651 B2
(45) Date of Patent: Aug. 21, 2018

(54) SYSTEM FOR SUPPLYING UNMELTED HOT MELT ADHESIVE PIECES

(71) Applicant: NORDSON CORPORATION, Westlake, OH (US)

(72) Inventor: Enes Ramosevac, Snellville, GA (US)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 15/484,990

(22) Filed: Apr. 11, 2017

(65) Prior Publication Data

US 2017/0312778 A1 Nov. 2, 2017

Related U.S. Application Data

(60) Provisional application No. 62/329,158, filed on Apr. 28, 2016.

(51) Int. Cl.
*B65G 53/14* (2006.01)
*B05C 11/10* (2006.01)
(Continued)

(52) U.S. Cl.
CPC ............ *B05C 11/101* (2013.01); *B05C 5/001* (2013.01); *B05C 11/11* (2013.01); *B65D 25/02* (2013.01); *B65D 43/163* (2013.01)

(58) Field of Classification Search
CPC ........ B65G 47/19; B65G 53/10; B65G 53/14; B65G 53/36; B65G 53/38; B65G 69/08
(Continued)

(56) References Cited

U.S. PATENT DOCUMENTS 873,748 A * 12/1907 Henson .................. B65G 65/00
198/525
1,323,663 A * 12/1919 Weber ................... B65G 53/12
222/226
(Continued)

FOREIGN PATENT DOCUMENTS

WO 2015/042382 A1 3/2015

OTHER PUBLICATIONS

European search report dated Oct. 4, 2017 for EP Application No. 17168656.
(Continued)

*Primary Examiner* — Joseph Dillon, Jr.
(74) *Attorney, Agent, or Firm* — Baker & Hostetler LLP

(57) ABSTRACT

A hot melt adhesive supply system is disclosed. The hot melt adhesive supply system includes an outer container defining an upper cavity and a lower cavity. The upper cavity includes an inner container having a top opening to receive unmelted hot melt adhesive pieces and a bottom aperture. The system also includes a dispensing mechanism between the upper cavity and the lower cavity. The dispensing mechanism regulates the dispensing of the unmelted hot melt adhesive pieces from the upper cavity to the lower cavity. The dispensing mechanism includes a base plate and one or more rotating members that rotate to move the unmelted hot melt adhesive pieces through a gap defined between the base plate and the bottom aperture. The system also includes a transfer conduit that communicates the unmelted hot melt adhesive pieces from the lower cavity to a hot melt adhesive melter.

25 Claims, 6 Drawing Sheets

(51) Int. Cl.
*B05C 5/00* (2006.01)
*B05C 11/11* (2006.01)
*B65D 25/02* (2006.01)
*B65D 43/16* (2006.01)

(58) Field of Classification Search
USPC .......... 406/31, 75, 92, 125, 126, 135, 144; 198/530, 532, 540, 541; 137/571
See application file for complete search history.

(56) References Cited

U.S. PATENT DOCUMENTS

| | | | | |
|---|---|---|---|---|
| 1,883,218 A * | 10/1932 | Wohlenberg | ............ | F23K 1/00 110/104 R |
| 2,032,367 A * | 3/1936 | Kennedy | ............ | B65G 53/525 141/67 |
| 2,120,003 A * | 6/1938 | Schanz | ............ | B05B 7/144 222/263 |
| 2,795,078 A * | 6/1957 | Santarelli | ............ | 222/240 |
| 2,848,281 A * | 8/1958 | Avard | ............ | A01C 7/00 406/125 |
| 2,938,751 A * | 5/1960 | Nogami | ............ | E21F 13/042 406/126 |
| 3,362,585 A * | 1/1968 | Nessim | ............ | B01F 15/00194 198/530 |
| 3,372,958 A * | 3/1968 | Black | ............ | B65G 53/00 406/109 |
| 3,391,778 A * | 7/1968 | Lasiter | ............ | B60P 1/40 198/530 |
| 3,445,007 A * | 5/1969 | Hoad | ............ | B65G 65/00 198/530 |
| 3,644,003 A * | 2/1972 | Von Funk | ............ | B65G 53/00 406/126 |
| 3,937,522 A * | 2/1976 | Korn | ............ | B24C 9/00 366/196 |
| 3,955,853 A * | 5/1976 | Rusterholz | ............ | B65G 53/525 406/109 |
| 3,981,417 A * | 9/1976 | Fassauer | ............ | B01J 8/002 222/227 |
| 4,111,492 A * | 9/1978 | Mraz | ............ | B65G 53/14 222/144.5 |
| 4,129,338 A * | 12/1978 | Mudgett | ............ | E04F 21/085 222/236 |
| 4,176,987 A * | 12/1979 | Reed | ............ | B65G 53/4616 137/386 |
| 4,242,007 A * | 12/1980 | Ogden | ............ | B65G 53/4691 406/109 |
| 4,697,962 A * | 10/1987 | Dunbar | ............ | B65G 53/12 406/120 |
| 4,746,250 A * | 5/1988 | Schoppe | ............ | B01F 3/06 222/331 |
| 4,780,027 A * | 10/1988 | Van Kuiken, Jr. | ............ | F42D 1/10 406/12 |
| 5,240,683 A * | 8/1993 | Maurel | ............ | B01F 5/24 422/135 |
| 5,358,371 A * | 10/1994 | Neddo | ............ | F16L 1/065 198/532 |
| 5,525,015 A * | 6/1996 | Morimoto | ............ | B65G 53/4683 406/125 |
| 5,634,713 A * | 6/1997 | Abe | ............ | B01F 13/0211 366/102 |
| 6,123,486 A * | 9/2000 | Wilms | ............ | B65B 88/68 222/237 |
| 6,379,086 B1 * | 4/2002 | Goth | ............ | B29C 47/10 406/130 |
| 6,742,679 B2 * | 6/2004 | Martin | ............ | B65D 88/68 222/168 |
| 7,228,990 B2 * | 6/2007 | Schmidt | ............ | B28C 5/40 141/83 |
| 7,770,713 B2 * | 8/2010 | Nakagawa | ............ | B65B 3/26 198/530 |
| 8,113,745 B2 * | 2/2012 | Aoki | ............ | B65G 53/525 406/126 |
| 8,967,919 B2 * | 3/2015 | Yaluris | ............ | B01J 8/0015 177/1 |
| 9,631,869 B2 * | 4/2017 | Shimono | ............ | F27D 3/0033 |
| 9,650,206 B2 * | 5/2017 | Steele | | |
| 2008/0179166 A1 * | 7/2008 | Monti | ............ | B65G 43/08 198/408 |
| 2008/0219778 A1 * | 9/2008 | Bowman | ............ | B05B 7/1431 406/135 |
| 2015/0122372 A1 * | 5/2015 | Stander | ............ | B01J 8/0025 141/5 |
| 2015/0298899 A1 | 10/2015 | Ganzer et al. | | |
| 2016/0101611 A1 | 4/2016 | Chau et al. | | |

OTHER PUBLICATIONS

European search opinion dated Jan. 18, 2018 for EP Application No. 17168656.

* cited by examiner

SYSTEM FOR SUPPLYING UNMELTED HOT MELT ADHESIVE PIECES

CROSS-REFERENCE TO RELATED APPLICATION

This application claims the benefit of U.S. Provisional Patent App. No. 62/329,158, filed Apr. 28, 2016, the disclosure of which is hereby incorporated in its entirety.

TECHNICAL FIELD

The present disclosure generally relates to hot melt adhesive systems, and more particularly to systems for supplying hot melt adhesive melters with unmelted hot melt adhesive pieces.

BACKGROUND

Hot melt adhesive systems have many applications in manufacturing and packaging. For example, thermoplastic hot melt adhesives are used for carton sealing, case sealing, tray forming, pallet stabilization, nonwoven applications including diaper manufacturing, and many other applications. Hot melt adhesives often come in the form of pellets or particulates, which are generally referred to as pieces, and are contained in or provided from an adhesive supply, such as a tank or hopper. The hot melt adhesive pieces can be heated and melted by a melter, and liquefied hot melt adhesive can be pumped to a dispenser, such as a dispensing gun or other applicator which applies the hot melt adhesive to a substrate. Hot melt adhesive, in its pre-melted state (referred to herein as hot melt adhesive pieces, or unmelted hot melt adhesive pieces), can be provided in a variety of shapes and sizes, ranging from small bb-sized pieces, to larger sized pieces which are sometimes referred to as "chips" and still larger "pillows" that are several inches in dimension. Hot melt adhesive pieces may be moved from the adhesive supply to the melter as part of an automated filling operation.

For example, air-driven, or pneumatic, transfer systems use the force of flowing air to move hot melt adhesive pieces from an adhesive supply to a melter. In a known arrangement, a transfer conduit connects the adhesive supply with the melter, and an air pump is operated to generate an air flow that moves hot melt adhesive pieces through the transfer hose from the adhesive supply to the melter.

Environmental conditions, however, can interfere with the movement of hot melt adhesive pieces from the adhesive supply to the melter. In particular, temperature and/or the amount of time that the hot melt adhesive pieces have been in the adhesive supply may affect the movement of the hot melt adhesive pieces. For example, as the environmental temperature increases, the hot melt adhesive pieces can begin to soften and stick together to form clumps of hot melt adhesive.

Pneumatic transfer systems have a limit relative to the size and weight of the hot melt adhesive that they can transfer in a cost effective manner. Large clumps of hot melt adhesive can be too large to fit through a transfer hose and travel between the adhesive supply and the melter. Large clumps can also be too heavy to be moved by a given pneumatic transfer system. If a melter is not provided with an appropriate flow of hot melt adhesive pieces, the melter will not be able to provide liquid hot melt adhesive to a dispenser. This would cause an undesirable disruption of a dispensing operation.

In addition, as hot melt adhesive pieces begin to stick together in the adhesive supply, features can be formed in the adhesive supply that also tend to deprive an adhesive melter with an appropriate flow of hot melt adhesive pieces. For example, hot melt adhesive pieces that have stuck together can create a clump or an even larger formation in the adhesive supply. Such a formation will not be moved out of the adhesive supply by the pneumatic transfer system. In addition, the formation is likely to block the flow of hot melt adhesive pieces from the adhesive supply to the transfer conduit that connects the adhesive supply with the melter. Moreover, clumps or large formations of hot melt adhesive tend to cause nearby hot melt adhesive pieces to stick to them, and this process can lead to substantially large formations in the adhesive supply.

In addition to increased temperatures, the amount of time that hot melt adhesive pieces have been sitting still in an adhesive supply can also cause problems for moving the hot melt adhesive pieces to a melter. The longer hot melt adhesive pieces sit in the adhesive supply, they can begin to stick together, leading to similar problems as those discussed above.

Therefore, there is a need for an improved hot melt adhesive supply system that overcomes the shortcomings addressed above.

SUMMARY

Disclosed herein is a hot melt adhesive supply system. In one exemplary embodiment, a hot melt adhesive supply system includes an outer container defining an upper cavity and a lower cavity. The upper cavity includes an inner container having a top opening configured to receive unmelted hot melt adhesive pieces. The upper cavity further includes a bottom aperture. The system also includes a dispensing mechanism between the upper cavity and the lower cavity. The dispensing mechanism is configured to regulate the dispensing of the unmelted hot melt adhesive pieces from the upper cavity to the lower cavity. The dispensing mechanism includes a base plate and one or more rotating members configured to rotate to move the unmelted hot melt adhesive pieces through a gap defined between the base plate and the bottom aperture of the inner container. The system further includes a transfer conduit configured to communicate the unmelted hot melt adhesive pieces from the lower cavity to a hot melt adhesive melter.

In an aspect, the dispensing mechanism of the aforementioned system may further include a rotating shaft having a longitudinal axis and extending perpendicularly from a center of the base plate. The one of more rotating members of the dispensing mechanism may extend perpendicularly, with respect to the longitudinal axis, from the rotating shaft. The one or more rotating members may be rigid. At least one of the one or more rotating members may be curved in a direction parallel to the base plate. The rotating shaft may rotate in a direction in which a convex side of the at least one of the one or more rotating members is leading. There may be three rotating members positioned equidistantly around a circumference of the rotating shaft.

The dispensing mechanism may further include one or more upper rotating members extending perpendicularly, with respect to the longitudinal axis, from an upper portion of the rotating shaft, wherein the upper portion of the rotating shaft is situated within the inner container. At least one of the one or more upper rotating members may be flexible. At least one of the one or more upper rotating members may be tangentially, with respect to a circumference of the rotating shaft, attached to the rotating shaft. The upper rotating members may be vertically, with respect to the longitudinal axis, offset on the rotating shaft from one another. The upper rotating members may be circumferentially positioned on the rotating shaft equidistantly from one another.

In another aspect, the dispensing mechanism of the aforementioned system may further include a cylindrical gate having a diameter greater than a diameter of the base plate and movable between an open position and a closed position. In the closed position, the cylindrical gate substantially overlaps with the gap to substantially block the gap and prevent hot melt adhesive pieces from passing therethrough. In the open position, the cylindrical gate does not substantially overlap with the gap and hot melt adhesive pieces are allowed to pass therethrough. A resilient actuator may be connected to the cylindrical gate, which causes the cylindrical gate to move to the closed position when external forces are not applied to the resilient actuator. A flexible curtain may be connected to the base plate and slidingly draped over the cylindrical gate.

In yet another aspect, the inner container may include a flexible material. The aforementioned system may include a compression plate and an actuator operatively connected to the compression plate. The compression plate may be configured to manipulate the hot melt adhesive pieces in the inner container upon operation of the actuator.

In still other aspects, the height of the gap may be adjustable between, for example, a range of about 0.5 inches to about 1.5 inches. The inner container may include a grate spanning the top opening. The inner container may include a level sensor configured to detect a level of unmelted hot melt adhesive pieces in the inner container. The level sensor may be communicatively connected to an indicator disposed on the outer container. The indicator may be at least one of a light or an audio alarm. The inner container may include an inner container window, and the outer container may include an outer container window correspondingly positioned with the inner container window.

In yet other aspects, the lower cavity may include a funnel leading to a transfer mechanism, where the transfer mechanism may be configured to move the unmelted hot melt adhesive pieces through the transfer conduit. The funnel may include an air-driven vibrator. The transfer mechanism may include an eductor or an air pump to generate air flow to move the unmelted hot melt adhesive pieces through the transfer conduit. The transfer mechanism may also an exhaust conduit connected to the air-driven vibrator and supplementing the air flow. The lower cavity may include a level sensor configured to detect a level of unmelted hot melt adhesive pieces in the funnel. The level sensor may be communicatively connected to an indicator disposed on the outer container, such as a light or an audio alarm.

In yet further aspects, the dispensing mechanism may be configured to reduce a rate at which the one or more rotating members rotate or stop dispensing the unmelted hot melt adhesive pieces responsive to the level sensor detecting that the level of unmelted hot melt adhesive pieces in the funnel exceeds a pre-determined threshold.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Figure 1:
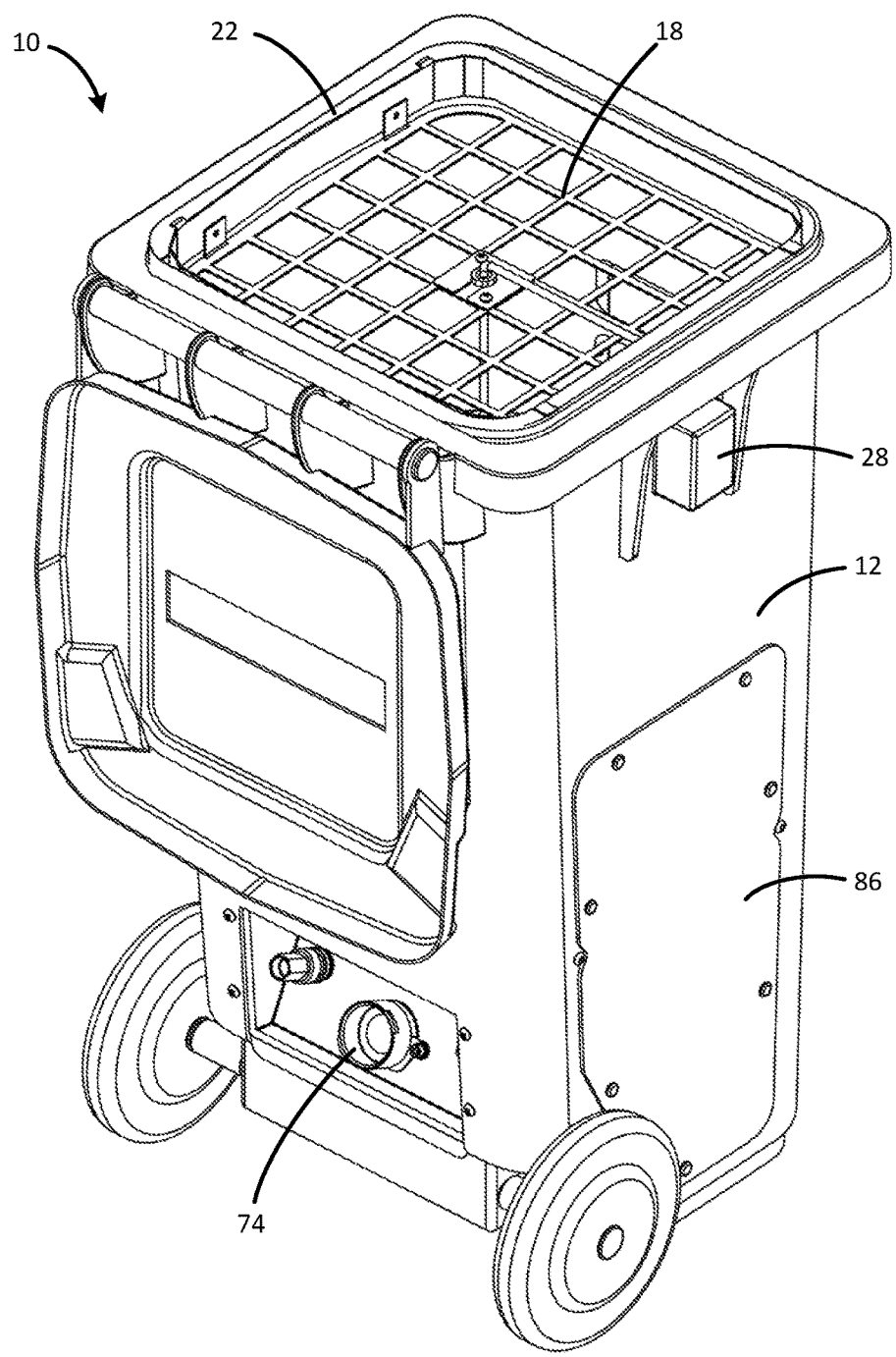
FIG. 1 illustrates an external perspective view of a hot melt adhesive supply system.
Figure 2:
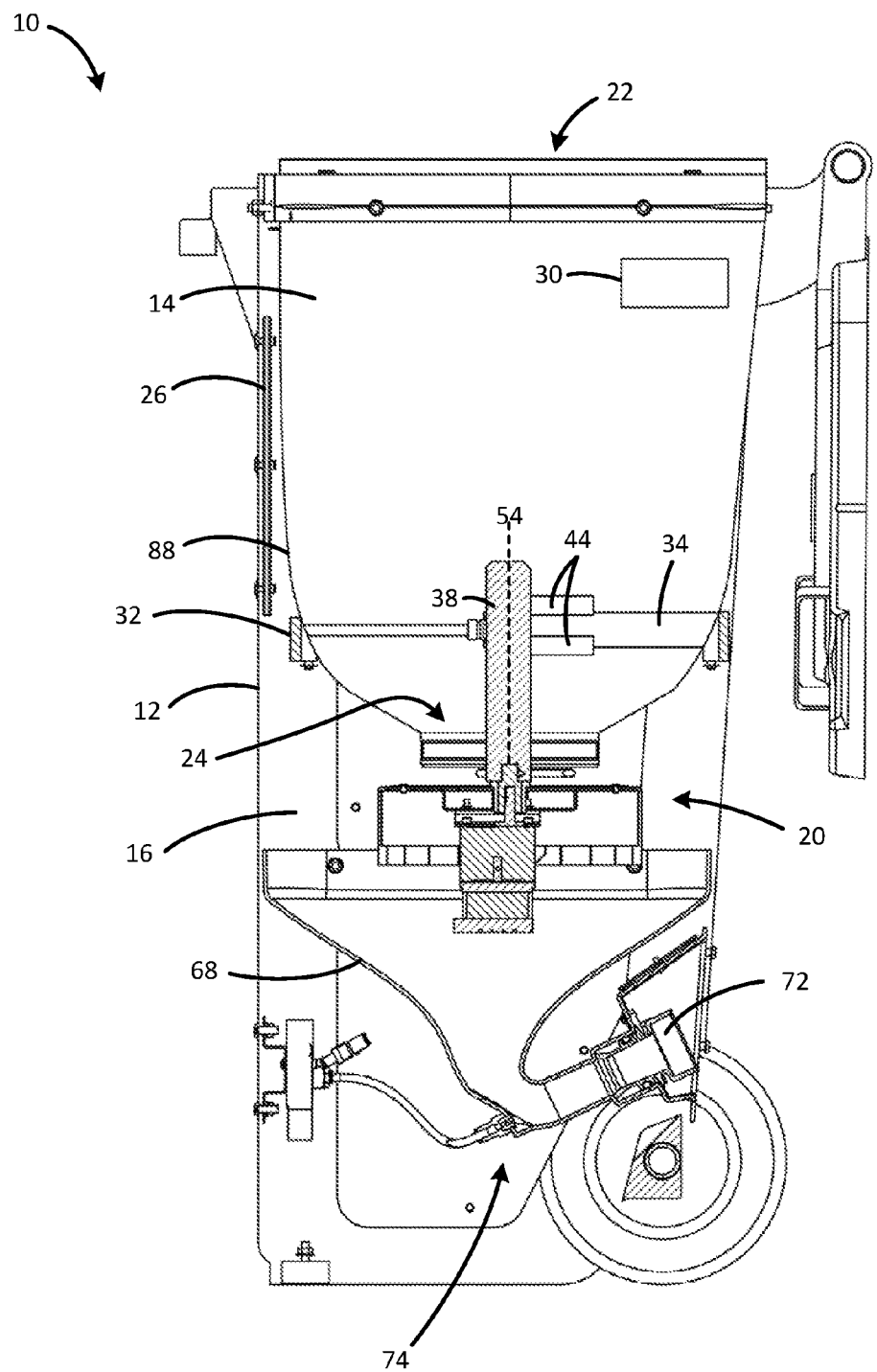
FIG. 2 illustrates a side cut-away view of the hot melt adhesive supply system.

FIGS. 1 and 2 illustrate an exemplary hot melt adhesive supply system 10 (the "supply system," hereinafter). In general, the supply system 10 is configured to receive a supply of hot melt adhesive pieces and provide, in a controlled manner, the hot melt adhesive pieces to an attached adhesive melter. The adhesive melter, in turn, may provide melted hot melt adhesive to an adhesive dispensing module.

The hot melt adhesive supply system 10 may include a rigid outer container 12. In some aspects, the outer container 12 may be formed from a plastic bin originally intended to contain refuse. The outer container 12 may include an upper cavity 14 that initially receives the supply of hot melt adhesive pieces and a lower cavity 16 from which hot melt adhesive pieces are transferred, via a transfer mechanism 72, to the attached adhesive melter. The upper cavity 14 may be defined by an upper container 88. A dispensing mechanism 20 may be disposed between the upper cavity 14 and the lower cavity 16 to facilitate a controlled dispensing of the hot melt adhesive pieces from the upper cavity 14 to the lower cavity 16.

An upper portion of the upper cavity 14 may be configured with an upper opening 22 through which an operator may deposit the supply of hot melt adhesive pieces into the upper cavity 14. In an aspect, the upper container 88 may be embodied as a flexible hopper (e.g., a fabric bag). The flexible hopper may be hung from the inside of the outer container 12 whereby the upper opening of the flexible hopper is attached near or at the top of the outer container 12. A lower portion of the upper cavity 14 may include a lower opening 24 through which the hot melt adhesive pieces may pass to the dispensing mechanism 20 and the lower cavity 16. As can be seen in FIGS. 1 and 2, the upper cavity 14 may be configured in a gentle funnel configuration due to the upper opening 22 being wider than the lower opening 24. Such a configuration may facilitate the downward flow of the hot melt adhesive pieces within the upper cavity 14.

A grate 18 may span the opening of the upper cavity 14 to shield the operator from the moving parts within the upper cavity 14. A portion of the outer container 12 corresponding to the upper cavity 14 may be configured with an upper window 26 to allow an operator to view the interior of the upper cavity 14, such as to check on the level of hot melt adhesive pieces within the upper cavity 14. The upper container 88 may be similarly configured with a window (not shown) corresponding to the upper window 26 of the outer container 12. The upper cavity 14 may further be configured with a level sensor 30 to detect the vertical level of the supply of hot melt adhesive pieces within the upper cavity 14, including whether the vertical level of the supply of hot melt adhesive pieces has dropped below a pre-determined threshold. The level sensor 30 may be positioned within the upper container 88 or affixed to a sidewall of the upper container 88. The height at which the level sensor 30 is positioned relative to the upper container 88 may correspond with the pre-determined low-level threshold. Accordingly, the position of the level sensor 30 relative to the upper container 88 may be adjusted to thereby adjust the pre-determined low-level threshold. The level sensor 30 may be communicatively connected to an indicator 28, such as a warning light disposed on the exterior of the outer container 12 or an audio alarm, to alert an operator that the upper cavity 14 is becoming empty or that any other problem with the supply system 10 has occurred.

One or more compression plates 32 may be operatively connected to one or more linear actuators 34 (e.g., pneumatic actuators). The arrangement of compression plates 32 and actuators 34 may be disposed within the outer container 12 but external to the upper cavity 14. When the actuators 34 operate (e.g., the cylinders of the pneumatic actuators alternately extend and retract), the attached compression plates 32 perform a compressive action upon the upper cavity 14 to manipulate the hot melt adhesive pieces therein. The compressive action of the compression plates 32 may serve to break up any coalesced clumps of hot melt adhesive pieces and/or help prevent the formation of said clumps.

Figure 3A:
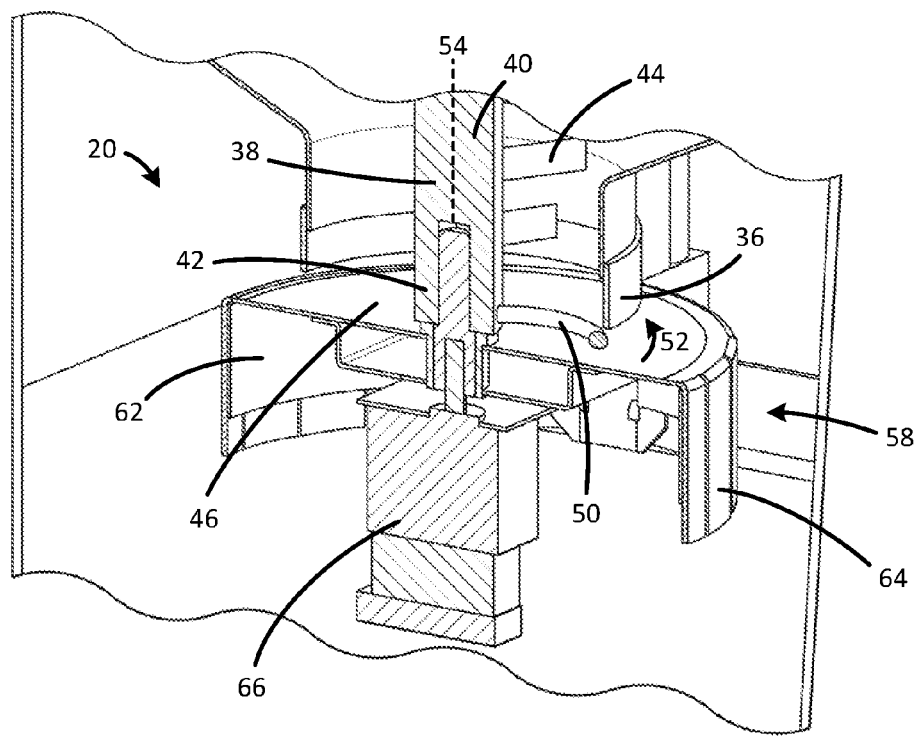
FIG. 3A illustrates a close-up perspective cut-away view of a dispensing mechanism of the hot melt adhesive supply system.
Figure 3B:
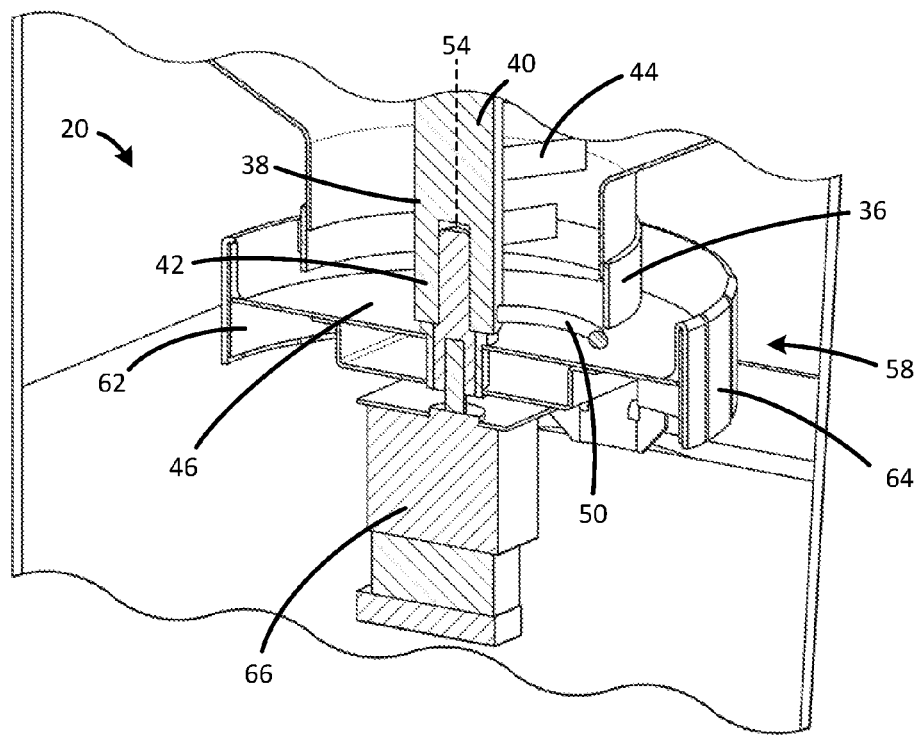
FIG. 3B illustrates a close-up perspective cut-away view of the dispensing mechanism of the hot melt adhesive supply.
Figure 4:
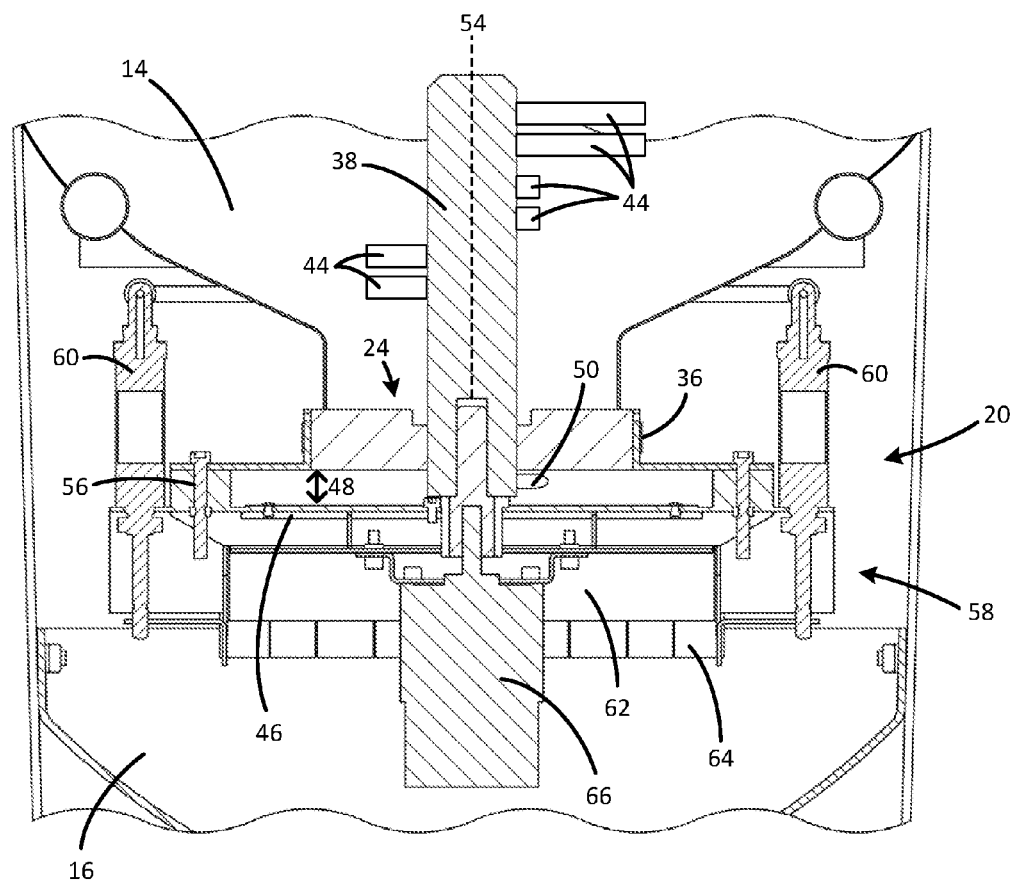
FIG. 4 illustrates a side view of the dispensing mechanism of the hot melt adhesive supply system.

With additional reference to FIGS. 3A, 3B, and 4, the hot melt adhesive pieces in the upper cavity 14 may be dispensed to the lower cavity 16 via the dispensing mechanism 20 situated between the upper cavity 14 and the lower cavity 16. The dispensing mechanism 20 may be supported by the upper cavity 14 or other otherwise secured within the outer container 12. For example, a band clamp 36 may be used to affix the dispensing mechanism 20 to the lower opening 24 of the upper cavity 14.

The dispensing mechanism 20 may include a rotating shaft 38 that protrudes through the lower opening 24 and into the upper cavity 14. The rotating shaft 38 may be driven by an electric motor 66, for example. The speed at which the rotating shaft 38 rotates may be varied according to the various properties of the particular type of hot melt adhesive pieces and/or the desired rate at which the supply system 10 is to provide the hot melt adhesive pieces to the attached adhesive melter. The rotating shaft 38 may comprise an upper portion 40 and a lower portion 42. The upper portion 40 may be defined as the portion of the rotating shaft 38 that extends into the upper cavity 14, inclusive of the lower opening 24. The lower portion 42 may be defined as the portion of the rotating shaft 38 that is external to (e.g., below) the upper cavity 14.

The upper portion 40 of the rotating shaft 38 may be configured with one or more upper members 44 that protrude perpendicularly, with respect to a longitudinal axis 54 of the rotating shaft 38, from the rotating shaft 38. The upper members 44 may be tangentially, with respect to the circumference of the rotating shaft 38, attached to the rotating shaft 38. In an aspect, the upper members 44 may be composed of a flexible material (e.g., fiberglass or rubber). As the rotating shaft 38 rotates, the upper members 44 agitate the hot melt adhesive pieces in the upper cavity 14, which may help to break apart coalesced clumps and/or prevent clumping. As a further benefit, the rotation of the upper members 44 through the hot melt adhesive pieces operates in complement with the compressive action of the compression plates 32. As the rotating shaft 38 rotates, the upper members 44 may tend to move the hot melt adhesive pieces away from the rotating shaft 38 and the concentric center of the upper cavity 14 and towards the periphery of the upper cavity 14, which may create an empty area or an area less dense with hot melt adhesive pieces. As the compressive action of the compression plates 32 massages or manipulates the hot melt adhesive pieces, the massaged or manipulated hot melt adhesive pieces may be shifted to the empty or less dense area formed by the rotating upper members 44, thus facilitating the downward movement of the hot melt adhesive pieces in the upper cavity 14.

As already mentioned, the upper members 44 may be flexible. This flexibility may impart the added benefit that when the rotating shaft 38 is rotated and the flexible upper members 44 encounter resistance from the hot melt adhesive pieces, an inner portion (i.e., proximate to the rotating shaft 38) of the upper member 44 may wrap around the circumference of the rotating shaft 38, effectively reducing the length by which the upper member 44 protrudes from the rotating shaft 38. When the upper member 44 is partially wrapped about the rotating shaft 38, the upper member 44 encounters less resistance from the hot melt adhesive pieces agitated by the upper member 44. As the partially wrapped upper member 44 encounters less hot melt adhesive pieces, the upper member 44 will correspondingly unwrap from the rotating shaft 38 and fully extend from the rotating shaft 38. In this manner, the flexible upper members 44 may self-regulate the amount of torque required to rotate the rotating shaft 38. Further, when encountering coalesced hot melt adhesive pieces, the flexible upper member 44, by wrapping itself around the rotating shaft 38, does not force but rather encourages adhesive movement. This minimizes deformation (e.g., smearing or fusing) of hot melt adhesive pieces which, if deformed, would otherwise exacerbate the problem of facilitating movement of the hot melt adhesive pieces.

The upper members 44 may be situated on the rotating shaft 38 in various configurations. In the exemplary configuration shown in FIG. 4, the rotating shaft 38 is configured with, for example, three pairs of upper members 44: a top pair, a middle pair, and a lower pair, wherein each is vertically, with respect to the longitudinal axis 54, offset from one another. The three pairs of upper members 44 may be equidistantly situated around the circumference of the rotating shaft 38, such that the top pair is offset about 120° from the middle pair, the middle pair is offset about 120° from the lower pair, and the lower pair is offset about 120° from the top pair. It will be appreciated, however, that the rotating shaft 38 may be configured with any number of upper members 44, in any size, and in any arrangement.

The dispensing mechanism 20 may include a base plate 46 that substantially blocks the uncontrolled free flow of hot melt adhesive pieces through the dispensing mechanism 20. The rotating shaft 38 may be attached to the dispensing mechanism 20 at the center of the base plate 46. The dispensing mechanism 20 may include a gap 48 (best seen in FIG. 4) formed between the base plate 46 and the rim of the lower opening 24 of the upper cavity 14. In some aspects, the gap 48 may be defined between the base plate 46 and the band clamp 36 attaching the dispensing mechanism 20 to the upper cavity 14. In one aspect, the gap 48 may be configured to be about 0.625 inches high to accommodate small, pellet-sized hot melt adhesive pieces (e.g., up to 6 mm diameter). In another aspect, the gap 48 may be configured to be about 1 inch to about 1.25 inches high to accommodate larger hot melt adhesive pieces (e.g., 6 mm to 12 mm diameter). In yet another aspect, the gap 48 may be configured to be about 1.25 inches high. In another aspect, the gap 48 may be configured to be about 0.5 inches to about 1.5 inches. The height of the gap 48 may be adjustable, such as to accommodate different sizes of hot melt adhesive pieces in separate dispensing cycles. To this end, one or more adjustable spacers 56 may be mounted along the periphery of the base plate 46 to adjust the gap 48 to the desired height.

One or more lower members 50 may be perpendicularly, with respect to the longitudinal axis 54 of the rotating shaft 38, attached to the lower portion 42 of the rotating shaft 38, proximate to the base plate 46. In an aspect, the lower members 50 may be attached tangentially, with respect to the circumference of the rotating shaft 38, to the rotating shaft 38. The rotating shaft 38 may be configured with one, two, three, or more of the lower members 50. In embodiments having more than one lower member 50, the lower members 50 may be equidistantly disposed around the circumference of the rotating shaft 38. In one exemplary embodiment, the rotating shaft 38 may be configured with three lower members 50 positioned equidistantly around the circumference of the rotating shaft 38.

As the lower members 50 rotate via the rotation of the rotating shaft 38, hot melt adhesive pieces, such as those in contact with the base plate 46, may be moved through the gap 48 to fall into the lower cavity 16. In various configurations, the lower members 50 may each be straight or curved (e.g., curved in a direction opposite the direction of rotation and parallel to the base plate 46) and composed of a rigid or a flexible material. In the embodiment shown in FIGS. 3A and 3B, the lower members 50 are each curved and rigid and rotate in the direction indicated by arrow 52. In such an embodiment, as the lower members 50 rotate, the convex side of each of the lower members 50 pushes the hot melt adhesive pieces outward from the center of the base plate 46 and through the gap 48.

The dispensing mechanism 20 may further be configured with a gating mechanism 58 to prevent the undesired spillage of hot melt adhesive pieces from the dispensing mechanism 20 into the lower cavity 16, such as when the operation of the supply system 10 is paused between dispensing cycles or while the supply system 10 is being moved. The gating mechanism 58 may include one or more actuators 60, such as spring return pneumatic actuators or other type of resilient actuator, that drive a gate 62 up and down in directions parallel to the longitudinal axis 54. The gate 62 may be cylindrical with an interior diameter slightly larger than the diameter of the base plate 46, such that the interior of the gate 62 is flush or almost flush with the peripheral edge of the base plate 46. As shown in FIG. 3A, when the actuators 60 are activated (e.g., pressurized) the gate 62 may be driven downward (i.e., in the direction towards the lower cavity 16) to an open position wherein the gap 48 is substantially unobstructed by the gate 62. As shown in FIG. 3B, the gate 62 may be moved upwards (i.e., in the direction towards the upper cavity 14), such as by operation of a spring or other resilient mechanism in each of the actuators 60, to a closed position. In the closed position, the gate 62 substantially obstructs the gap 48, thereby preventing the undesired passage of hot melt adhesive pieces into the lower cavity 16. When the actuators 60 are configured as spring return pneumatic actuators, this may impart the benefit that the gate 62 is automatically put in the closed position by the springs of the spring return pneumatic actuators in the event that the actuators 60 are depressurized, such as if the supply system 10 loses power.

To prevent hot melt adhesive pieces from becoming wedged between the base plate 46 and the gate 62 and interfering with the operation of the gate 62, the dispensing mechanism 20 may be configured with a flexible curtain 64, such as a fabric curtain. The curtain 64 may be attached to and hung from the periphery of the base plate 46 and draped over the gate 62. As may be seen in FIGS. 3A and 3B, when the gate 62 is raised to the closed position, the curtain 64 slides over the top edge of the gate 62 while still remaining at least substantially draped over the gate 62. In this manner, the curtain 64 may prevent any hot melt adhesive pieces from becoming wedged between the base plate 46 and the gate 62 and/or prevent any hot melt adhesive pieces from escaping between the base plate 46 and the gate 62.

As the hot melt adhesive pieces are dispensed from the dispensing mechanism 20, they fall into the lower cavity 16. The lower cavity 16 may be defined at the sides by the side walls of the outer container 12, at the top by the exterior of the upper cavity 14 and the dispensing mechanism 20, and at the bottom by a funnel 68. The funnel 68 may channel the dispensed hot melt adhesive pieces into the transfer mechanism 72. The transfer mechanism 72 may refer generally to one or more components configured to communicate the hot melt adhesive pieces dispensed into the lower cavity 16 to the attached adhesive melter. The transfer mechanism 72 may include a transfer conduit 74 through which the hot melt adhesive pieces are expelled from the transfer mechanism 72 and the supply system 10.

Figure 5:
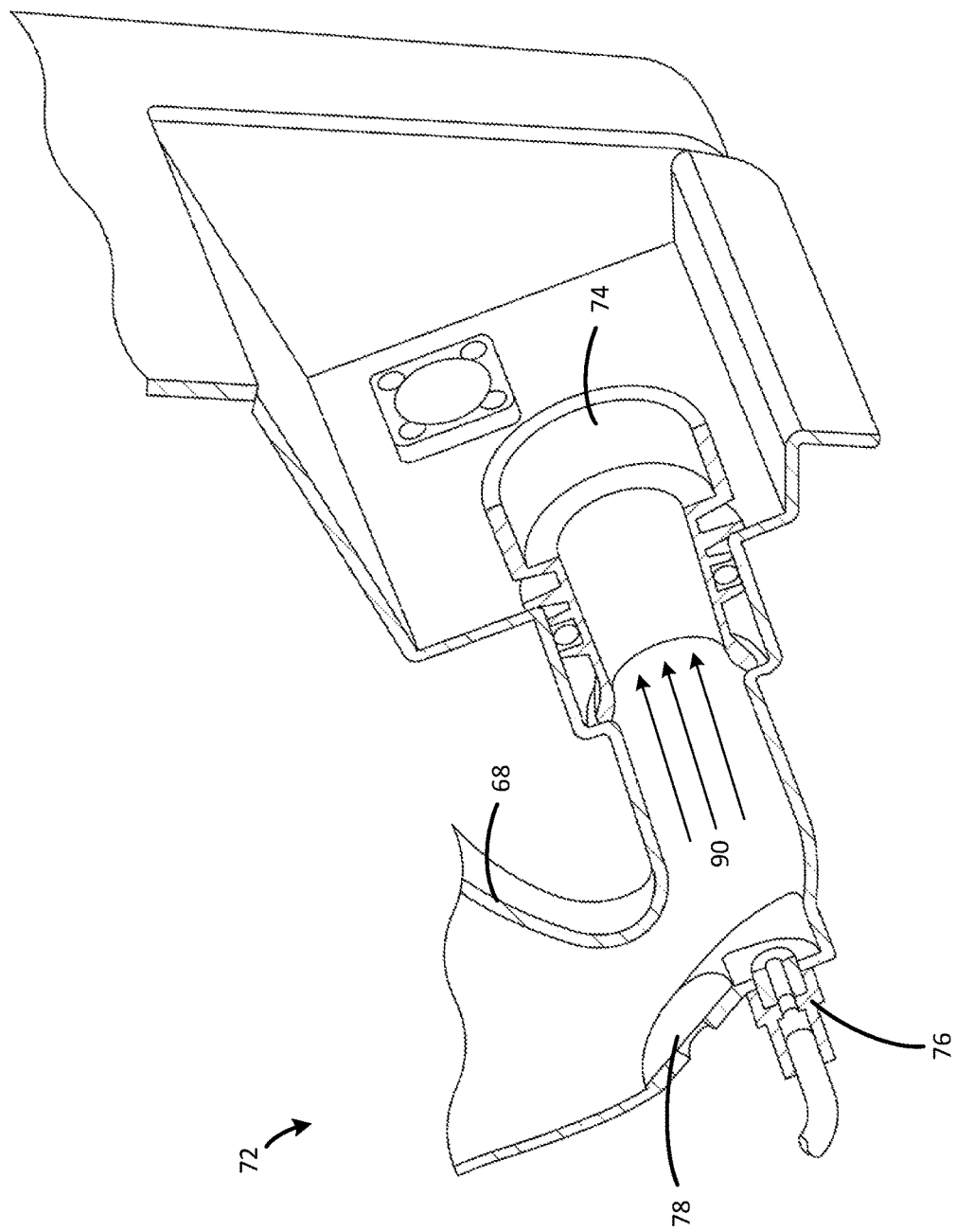
FIG. 5 illustrates a close-up perspective cut-away view of a transfer mechanism of the hot melt adhesive supply system.

FIG. 5 provides a close-up illustration of one exemplary embodiment of the transfer mechanism 72. In this embodiment, the transfer mechanism 72 includes an eductor 76 that generates airflow 90 to move the hot melt adhesive pieces through and out of the transfer conduit 74. A lower cavity level sensor 78 may be disposed at the bottom of the funnel 68 to detect if transfer mechanism 72 is overwhelmed with hot melt adhesive pieces and hot melt adhesive pieces are backing up in the bottom of the funnel 68. If accumulation of hot melt adhesive pieces is detected (e.g., the level of hot melt adhesive pieces in the funnel exceeds a pre-determined threshold), the rotation rate of the lower member 50 of the dispensing mechanism 20 (to which the lower cavity level sensor 78 is communicatively connected) may be slowed down or stopped and/or the indicator 28 may be activated to notify an operator.

Figure 6:
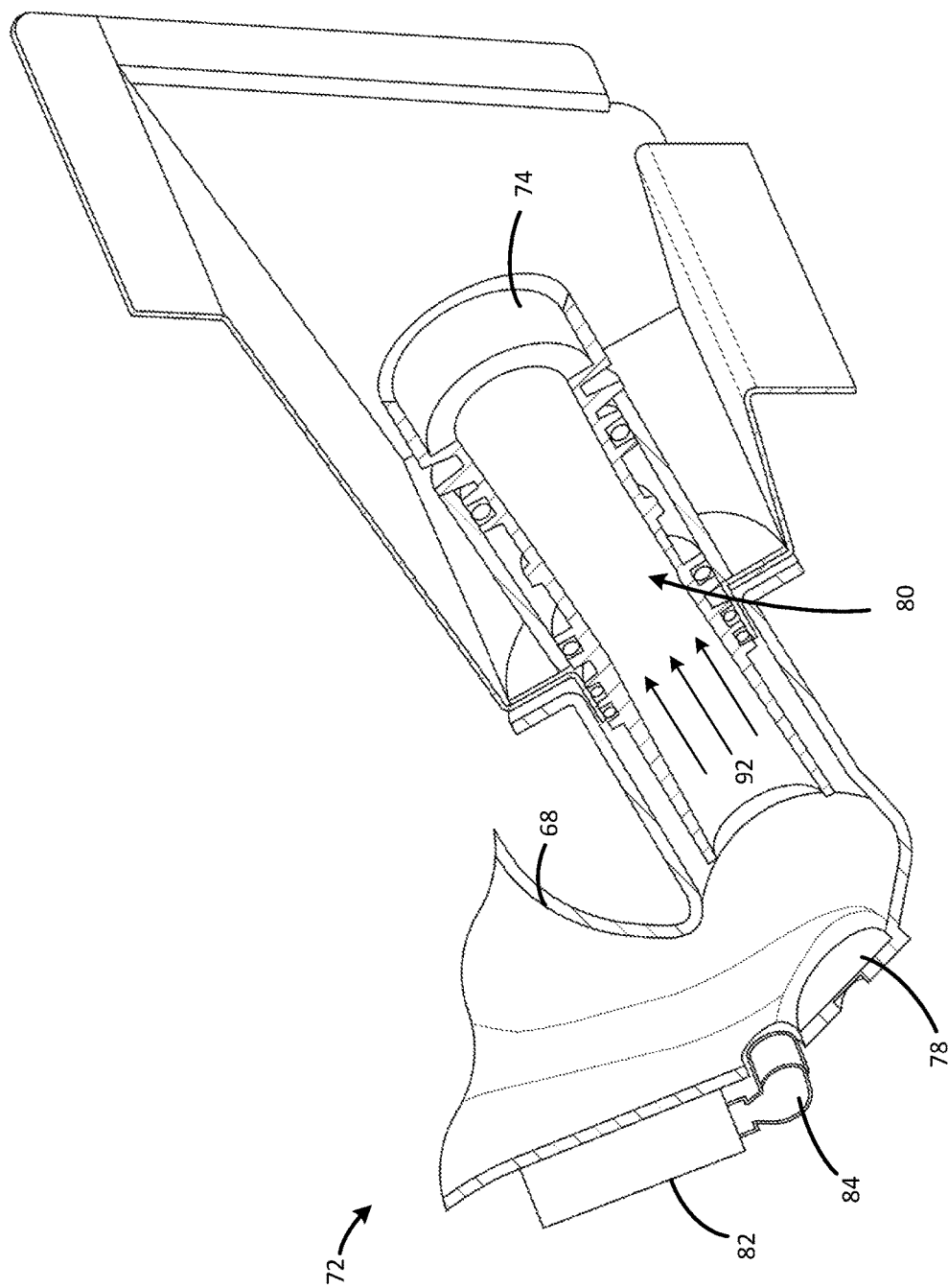
FIG. 6 illustrates another close-up perspective cut-away view of a transfer mechanism of the hot melt adhesive supply system.

FIG. 6 provides a close-up illustration of another exemplary embodiment of the transfer mechanism 72. In this embodiment, an air pump 80 may be employed in the transfer mechanism 72 generate an airflow 92 to move the hot melt adhesive pieces from the bottom of the funnel 68 and through the transfer conduit 74. The transfer mechanism 72 may further include a vibrator 82, such as an air-driven vibrator, attached to the bottom of the funnel 68. The vibration provided by the vibrator 82 may deter coalescing between the hot melt adhesive pieces, facilitate movement of the hot melt adhesive pieces in the funnel 68 and transfer mechanism 72, and/or assist in aligning the hot melt adhesive pieces for movement through the transfer mechanism 72. If the vibrator 82 is air-driven, exhaust from the vibrator 82 may flow via an exhaust conduit 84 to supplement the airflow 92 in the transfer mechanism 72. As described above in relation to FIG. 5, the lower cavity level sensor 78 may also be included in the embodiment illustrated in FIG. 6.

The outer container 12 may be configured with a removable panel 86 adjacent to the lower cavity 16 and/or the transfer mechanism 72. The removable panel 86 may be removed to provide physical access to the dispensing mechanism 20, the lower cavity 16, or the transfer mechanism 72, such as to perform adjustment, maintenance, or repair. In an aspect, the removable panel 86 may be transparent to provide visual access to the dispensing mechanism 20, the lower cavity 16, or the transfer mechanism 72, such as to visually evaluate if the hot melt adhesive pieces are moving properly through the transfer mechanism 72 or if they are building up in the funnel 68.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A hot melt adhesive supply system, comprising:
   an outer container defining an upper cavity and a lower cavity, the upper cavity comprising an inner container having a top opening configured to receive unmelted hot melt adhesive pieces and a bottom aperture;
   a dispensing mechanism between the upper cavity and the lower cavity and configured to regulate dispensing of the unmelted hot melt adhesive pieces from the upper cavity to the lower cavity, the dispensing mechanism comprising:
   a base plate; and
   one or more rotating members configured to rotate to move the unmelted hot melt adhesive pieces through a circumferential gap defined between the base plate and a periphery of the bottom aperture of the inner container; and
   a transfer conduit configured to communicate the unmelted hot melt adhesive pieces from the lower cavity to a hot melt adhesive melter.

2. The system of claim 1, wherein the dispensing mechanism further comprises:
   a rotating shaft having a longitudinal axis and extending perpendicularly from a center of the base plate, the one or more rotating members extending perpendicularly, with respect to the longitudinal axis, from the rotating shaft.

3. The system of claim 2, wherein at least one of the one or more rotating members is curved in a direction parallel to the base plate.

4. The system of claim 3, wherein the rotating shaft rotates in a direction in which a convex side of the at least one of the one or more rotating members is leading.

5. The system of claim 2, wherein the dispensing mechanism further comprises:

one or more upper rotating members extending perpendicularly, with respect to the longitudinal axis, from an upper portion of the rotating shaft, the upper portion of the rotating shaft situated within the inner container.

6. The system of claim 5, wherein at least one of the one or more upper rotating members is flexible.

7. The system of claim 5, wherein the one or more upper rotating members comprises a first upper rotating member, a second upper rotating member, and a third upper rotating member, wherein each of the first upper rotating member, the second upper rotating member, and the third upper rotating member are vertically, with respect to the longitudinal axis, offset on the rotating shaft from one another.

8. The system of claim 7, wherein the first upper rotating member, the second upper rotating member, and the third upper rotating member are circumferentially positioned on the rotating shaft equidistantly from one another.

9. The system of claim 1, wherein the dispensing mechanism further comprises:
   a cylindrical gate having a diameter greater than a diameter of the base plate and movable between an open position and a closed position, wherein the cylindrical gate substantially overlaps, vertically, with the circumferential gap in the closed position to substantially block the circumferential gap, and does not substantially overlap with the circumferential gap in the open position.

10. The system of claim 9, wherein the dispensing mechanism further comprises:
    a resilient actuator connected to the cylindrical gate, wherein the resilient actuator causes the cylindrical gate to move to the closed position when external forces are not applied to the resilient actuator.

11. The system of claim 9, wherein the dispensing mechanism further comprises:
    a flexible curtain connected to the base plate and slidingly draped over the cylindrical gate.

12. The system of claim 1, wherein the inner container comprises a flexible material.

13. The system of claim 12, further comprising:
    a compression plate; and
    an actuator operatively connected to the compression plate, wherein the compression plate is configured to manipulate the hot melt adhesive pieces in the inner container upon operation of the actuator.

14. The system of claim 1, wherein the inner container comprises a level sensor configured to detect a level of unmelted hot melt adhesive pieces in the inner container.

15. The system of claim 1, wherein the lower cavity comprises a funnel leading to a transfer mechanism, the transfer mechanism configured to move the unmelted hot melt adhesive pieces through the transfer conduit.

16. The system of claim 15, wherein the transfer mechanism comprises an eductor or an air pump to generate air flow to move the unmelted hot melt adhesive pieces through the transfer conduit.

17. The system of claim 15, wherein the lower cavity comprises a level sensor configured to detect a level of unmelted hot melt adhesive pieces in the funnel.

18. The system of claim 17, wherein the level sensor is communicatively connected to the dispensing mechanism, the dispensing mechanism configured to reduce a rate at which the one or more rotating members rotate responsive to the level sensor detecting that the level of unmelted hot melt adhesive pieces in the funnel exceeds a pre-determined threshold.

19. The system of claim 17, wherein the level sensor is communicatively connected to the dispensing mechanism, the dispensing mechanism being configured to stop dispensing the unmelted hot melt adhesive pieces responsive to the level sensor detecting that the level of unmelted hot melt adhesive pieces in the funnel exceeds a pre-determined threshold.

20. The system of claim 15, wherein the funnel is configured with an air-driven vibrator.

21. The system of claim 1, wherein the circumferential gap extends between a top surface of the base plate and the periphery of the bottom aperture of the inner container.

22. A hot melt adhesive supply system, comprising:
an outer container defining an upper cavity and a lower cavity, the upper cavity comprising an inner container having a top opening configured to receive unmelted hot melt adhesive pieces and a bottom aperture;
a dispensing mechanism between the upper cavity and the lower cavity and configured to regulate dispensing of the unmelted hot melt adhesive pieces from the upper cavity to the lower cavity, the dispensing mechanism comprising:
a base plate;
a rotating shaft having a longitudinal axis and extending perpendicularly from a center of the base plate;
one or more rotating members extending from the rotating shaft and configured to rotate to move the unmelted hot melt adhesive pieces through a gap defined between the base plate and the bottom aperture of the inner container; and
one or more upper rotating members extending perpendicularly, with respect to the longitudinal axis, from an upper portion of the rotating shaft, the upper portion of the rotating shaft situated within the inner container, wherein the one or more upper rotating members comprises two or more upper rotating members that are vertically, with respect to the longitudinal axis, offset on the rotating shaft from one another; and a transfer conduit configured to communicate the unmelted hot melt adhesive pieces from the lower cavity to a hot melt adhesive melter.

23. A hot melt adhesive supply system, comprising:
an outer container defining an upper cavity and a lower cavity, the upper cavity comprising an inner container having a top opening configured to receive unmelted hot melt adhesive pieces and a bottom aperture;
a dispensing mechanism between the upper cavity and the lower cavity and configured to regulate dispensing of the unmelted hot melt adhesive pieces from the upper cavity to the lower cavity, the dispensing mechanism comprising:
a base plate; and
one or more rotating members configured to rotate to move the unmelted hot melt adhesive pieces through a gap defined between the base plate and the bottom aperture of the inner container;
a transfer conduit configured to communicate the unmelted hot melt adhesive pieces from the lower cavity to a hot melt adhesive melter; and
a level sensor in the lower cavity that is communicatively connected to the dispensing mechanism and configured to detect a level of unmelted hot melt adhesive pieces in the lower cavity, the dispensing mechanism configured to alter a rate at which the one or more rotating members rotate based on the level of unmelted hot melt adhesive pieces in the lower cavity.

24. The system of claim 23, wherein the dispensing mechanism is further configured to reduce the rate at which the one or more rotating members rotate responsive to the level sensor detecting that the level of unmelted hot melt adhesive pieces in the lower cavity exceeds a pre-determined threshold.

25. The system of claim 23, wherein the dispensing mechanism is further configured to stop dispensing the unmelted hot melt adhesive pieces responsive to the level sensor detecting that the level of unmelted hot melt adhesive pieces in the lower cavity exceeds a pre-determined threshold.

* * * * *